United States Patent
Cuberson et al.

(10) Patent No.: US 8,064,357 B2
(45) Date of Patent: Nov. 22, 2011

(54) METHODS, DSL MODEMS, AND COMPUTER PROGRAM PRODUCTS FOR PROVISIONING DSL SERVICE USING DOWNLOADED USERNAME/PASSWORD

(75) Inventors: Russel D. Cuberson, Austell, GA (US); Marc L. Warshawsky, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 856 days.

(21) Appl. No.: 11/348,073

(22) Filed: Feb. 6, 2006

(65) Prior Publication Data
US 2007/0186113 A1  Aug. 9, 2007

(51) Int. Cl.
*H04L 12/26* (2006.01)
*H04L 12/56* (2006.01)
*G06F 21/00* (2006.01)

(52) U.S. Cl. ............... 370/252; 370/395.2; 713/184

(58) Field of Classification Search .............. None
See application file for complete search history.

(56) References Cited

U.S. PATENT DOCUMENTS

| | | | |
|---|---|---|---|
| 5,768,373 A * | 6/1998 | Lohstroh et al. | 380/286 |
| 6,463,528 B1 * | 10/2002 | Rajakarunanayake et al. | 713/1 |
| 6,678,733 B1 * | 1/2004 | Brown et al. | 709/229 |
| 6,977,906 B2 * | 12/2005 | Owens et al. | 370/252 |
| 6,983,381 B2 * | 1/2006 | Jerdonek | 726/5 |
| 7,047,304 B2 * | 5/2006 | Senapati et al. | 709/229 |
| 7,073,055 B1 * | 7/2006 | Freed et al. | 713/155 |
| 7,096,490 B2 * | 8/2006 | Xiong et al. | 726/3 |
| 7,099,957 B2 * | 8/2006 | Cheline et al. | 709/245 |
| 7,181,762 B2 * | 2/2007 | Jerdonek | 726/2 |
| 7,196,805 B1 * | 3/2007 | Toebes et al. | 358/1.15 |
| 7,197,550 B2 * | 3/2007 | Cheline et al. | 709/223 |
| 7,299,354 B2 * | 11/2007 | Khanna et al. | 713/165 |
| 7,366,702 B2 * | 4/2008 | David | 705/67 |
| 7,376,751 B2 * | 5/2008 | Gautier | 709/245 |
| 2002/0035536 A1 * | 3/2002 | Gellman | 705/37 |
| 2002/0188844 A1 * | 12/2002 | Yoshinobu | 713/163 |
| 2004/0128551 A1 * | 7/2004 | Walker et al. | 713/201 |
| 2004/0139354 A1 * | 7/2004 | Jones et al. | 713/202 |
| 2005/0050161 A1 * | 3/2005 | Arnold et al. | 709/217 |
| 2005/0195854 A1 * | 9/2005 | Agmon et al. | 370/465 |
| 2005/0261970 A1 * | 11/2005 | Vucina et al. | 705/16 |
| 2006/0256800 A1 * | 11/2006 | Harrington et al. | 370/401 |

FOREIGN PATENT DOCUMENTS

JP   2005196431 A   *   7/2005

OTHER PUBLICATIONS

Machine translation of JP2005-196431, N. Sugimoto, "Device for providing ADSL communications service", published Jul. 21, 2005.*
Technical Report, DSL Forum TR-069, CPE WAN Management Protocol, Produced by: DSLHome-Technical Working Group, Editors: Bernstein et al., Working Group Co-Chairs: Bathrick et al. p. 1-109 (2004).

* cited by examiner

*Primary Examiner* — Daniel J Ryman
*Assistant Examiner* — Cassandra Decker
(74) *Attorney, Agent, or Firm* — Guntin Meles & Gust, PLC; Andrew Gust

(57) ABSTRACT

A method of providing communications can include transmitting a default username and password for a subscriber account from a Digital Subscriber Link (DSL) modem to an authentication server. The subscriber account is authorized based on the default username and password subscriber. A unique username and password for the subscriber account is transmitted to the DSL modem if the subscriber account is authenticated.

8 Claims, 6 Drawing Sheets

METHODS, DSL MODEMS, AND COMPUTER PROGRAM PRODUCTS FOR PROVISIONING DSL SERVICE USING DOWNLOADED USERNAME/PASSWORD

CROSS-REFERENCE TO RELATED APPLICATION

This application is related to U.S. patent application Ser. No. 11/348,049, entitled, Methods, systems, and computer program products, for providing supported DSL communications features as selections, filed concurrently with the present application, the entirety of which is incorporated herein by reference.

FIELD OF THE INVENTION

The present invention generally relates to the field of electronic communications.

BACKGROUND

One of the issues that arises given the increasing desire for high speed Internet access, is the complexity of installing devices, such as modems, at a subscriber's location. In particular, Digital Subscriber Line (DSL) service for Internet access has become popular due to the relatively high speed with which data can be transported between a network access provider and the subscriber's location.

Typically, the service provider delivers a DSL modem to the subscriber's location for installation so that the subscriber may access the services provided. The installation may require the subscriber to load a CD-ROM into a personal computer connected to the DSL modem, which is coupled to a network connection over which the network access provider provides the Internet service.

As part of the installation procedure, the subscriber may need to enter a unique user name and password assigned by the network access provider that can be used to authenticate the subscriber's account (and access) to the network. For example, the network access provider may include the unique user name and password for the subscriber's account printed on a receipt included with the DSL modem. When the subscriber installs the DSL modem (using the PC and the CD-ROM), the subscriber may be prompted for the unique user name and password as part of the authentication process, which may complicate the installation procedure especially if the subscriber is unfamiliar with computers and/or the Internet.

SUMMARY

Embodiments according to the invention can provide methods, DSL modems, and computer program products for provisioning DSL service using downloaded username/password. Pursuant to these embodiments, a method of providing communications can include transmitting a default username and password for a subscriber account from a Digital Subscriber Link (DSL) modem to an authentication server. The subscriber account is authorized based on the default username and password subscriber. A unique username and password for the subscriber account is transmitted to the DSL modem if the subscriber account is authenticated.

In some embodiments according to the invention, the method further includes storing the unique username and password for the subscriber account in the DSL modem. In some embodiments according to the invention, the method further includes transmitting the unique username and password for the subscriber account from the DSL modem to the authentication server. The unique username and password for the subscriber account are determined not to be the default username and password. The unique username and password for the subscriber account are indicated as being authentic to a network access server and the subscriber account is authorized at the network access server based the authentication.

In some embodiments according to the invention, transmitting a default username and password for a subscriber account includes transmitting the default username and password and DSL modem parameters including a unique DSL modem identifier. In some embodiments according to the invention, authenticating the subscriber account further includes receiving the default username and password at the authentication server. A connection is provided between the DSL modem and a walled garden website providing terms and conditions for the subscriber account thereon. Input is received via the connection indicating acceptance or rejection of the terms and conditions for the subscriber account and DSL modem parameters including a unique DSL modem identifier are transmitted to a Customer Premises Equipment Management System (CPEMS) indicating acceptance of the terms and conditions for the subscriber account.

In some embodiments according to the invention, the default username and password for the subscriber account are stored in the DSL modem prior to delivery to a subscriber. In some embodiments according to the invention, transmitting a default username and password for a subscriber account includes uploading the default username and password from the DSL modem to the authentication server using a CPE initiated notification message including a unique DSL modem identifier and DSL modem manufacturer.

In some embodiments according to the invention, transmitting a unique username and password for the subscriber account includes downloading the unique username and password to the DSL modem using an asynchronous Customer Premises Equipment Management System (CPEMS) initiated notification message. In some embodiments according to the invention, the CPE initiated notification message and the CPEMS initiated notification message are TR-069 CPE WAN Management Protocol formatted communications.

In some embodiments according to the invention, a Digital Subscriber Line (DSL) modem includes a transceiver circuit configured to transmit and receive data via a connection to a network. A processor circuit is coupled to the transceiver circuit and is configured to coordinate communications between subscriber equipment and the network and configured to transmit a default username and password for a subscriber account from the modem to an authentication server included in the network via the transceiver circuit. A non-volatile memory is coupled to the processor circuit and is configured to store the default username and password subscriber therein.

In some embodiments according to the invention, a method of establishing Digital Subscriber Line (DSL) service includes transmitting a unique username and password for a DSL subscriber account from a DSL authentication server to a DSL modem associated with the DSL subscriber account responsive to authenticating the DSL subscriber account using a default username and password received from the DSL modem during an installation of the DSL modem. In some embodiments according to the invention, transmission of the unique username and password occurs after receiving the default username and password without subscriber intervention therebetween.

DESCRIPTION OF THE EMBODIMENTS ACCORDING TO THE INVENTION

Figure 1:
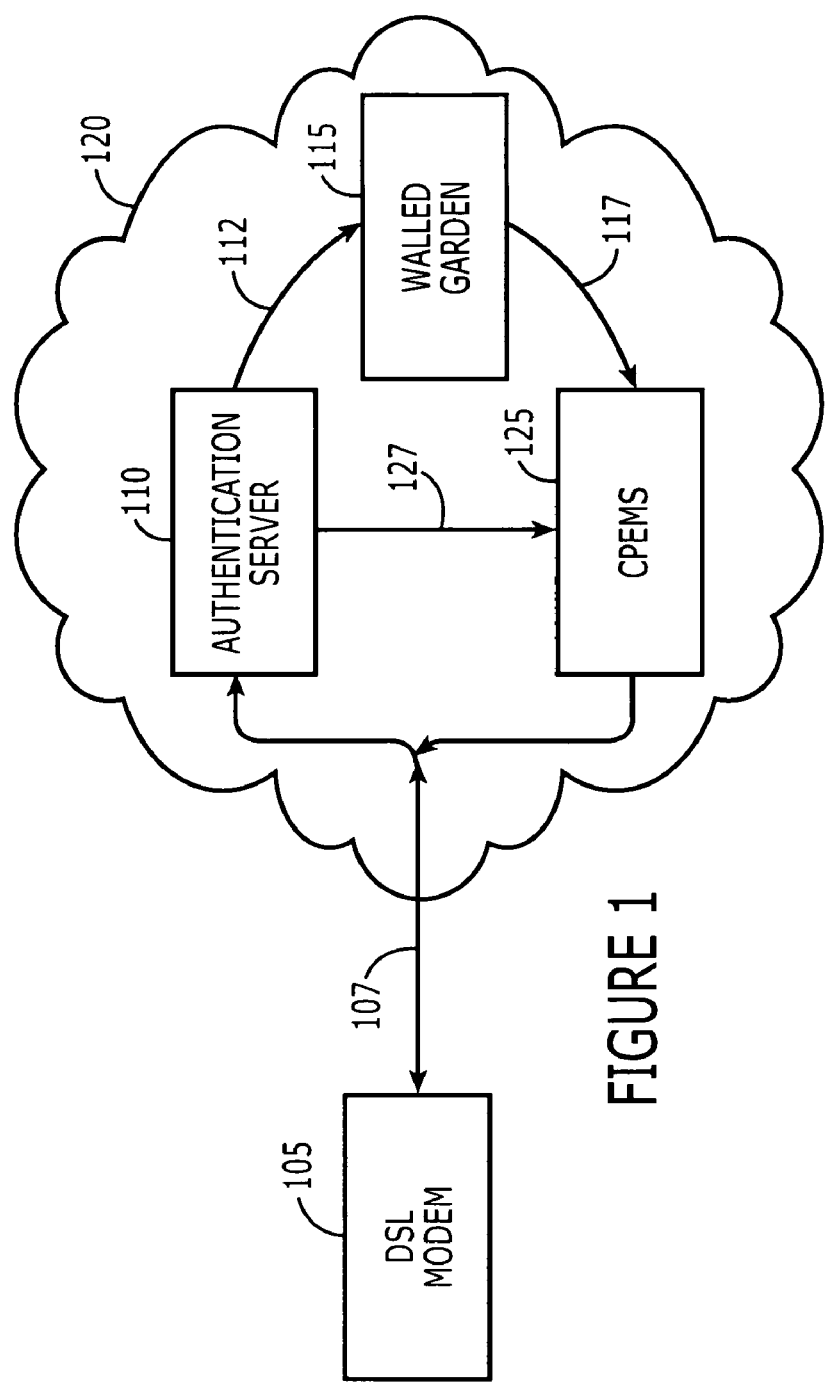
FIG. 1 is a schematic illustration of a DSL modem coupled to a network access provider system according to some embodiments of the invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

The present invention is described below with reference to diagrams (such as block diagrams, schematic diagrams, and flowcharts) and/or operational illustrations of methods, modems, systems and computer program products according to some embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The present invention may be embodied in hardware and/or in software (including firmware, resident software, microcode, etc.) including a combination of both. For example, DSL modems according to some embodiments of the invention may be implemented as a processor circuit that operates according to software executed by the processor circuit. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The computer program code may be provided to a processor of a general purpose computer, special purpose computer, or other programmable data processing apparatus as instructions to produce a machine, such that the instructions, which execute via the processor of the computer or other programmable data processing apparatus, create means for implementing the functions specified in the block and/or flowchart block or blocks.

The computer code may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

Embodiments according to the invention can operate in a logically separated client side/server side-computing environment, sometimes referred to hereinafter as a client/server environment. The client/server environment is a computational architecture that involves a client process (i.e., a client) requesting service from a server process (i.e., a server). In some embodiments according to the invention for example, the DSL modem may be considered the Client and the authentication server may be considered the server.

As described herein below in greater detail, in some embodiments according to the invention, a DSL modem can be preconfigured with a default user name and password prior to delivery and installation at a subscriber location. Upon installation, the DSL modem can transmit the default user name and password over a network connection to a network access provider that includes an authentication server. The authentication server can authenticate the default user name and password for the subscriber account, whereupon the authentication server may indicate to a CPE Management System (CPEMS) that the DSL modem for the subscriber account has been authenticated.

The CPE management system can then transmit a unique user name and password to the authenticated DSL modem. The DSL modem can store the unique user name and password for use in subsequent access to the network. The DSL modem can then transmit the default user name and password to the network access provider, whereupon the authentication server authenticates the subscriber account for subsequent access.

Accordingly, the installation of the DSL modem may be conducted with a reduced amount of subscriber intervention. In particular, the DSL modem may be connected to the network, powered on, and authenticated (as described above) without the subscriber providing the unique user name and password assigned by the network access provider, thereby allowing the installation to be simplified.

In other embodiments according to the invention, before the authentication server indicates the subscriber account is authenticated, the connection to the DSL modem may be re-directed to a "walled garden" which may present the subscriber with a list of terms and conditions required by the network access provider. Upon acceptance of the terms and conditions, the CPE management system is notified that that the subscriber account associated with the DSL modem that transmitted the default user name and password is authentic. Subsequently, provisioning the DSL modem with the unique user name and password may proceed as outlined above.

FIG. 1 is a schematic illustration of a DSL modem 105 connected to a network access provider including an authentication server 110 according to some embodiments of the invention. According to FIG. 1, the DSL modem 105 is provided to a subscriber location associated with a subscriber account for access to the network access provider. The DSL modem 105 is preconfigured with the default user name and password so that, for example, many different DSL modems 105 provided to different subscriber locations can each have the same default user name and password preconfigured therein. It will be further understood that the default user name and password for the DSL modem may be preconfigured at the time of manufacture or otherwise prior to delivery to the subscriber location.

During installation, the DSL modem 105 is coupled to a network connection 107 that provides connectivity to the network access provider system 120 including the authentication server 110. The authentication server 110 provides authentication services for access requests to the network access provider. Accordingly, when the DSL modem 105 requests a connection to the network access provider system 120, the authentication server 110 is invoked to determine whether the user name and password provided by the DSL modem 105 is authentic. In particular, during installation, the DSL modem 105 transmits the default user name and password to the network access provider which may call the authentication server 110 to determine whether the default user name and password is authentic. As used herein, the term "authentication" or "authentic" refers to the confirmation that a connection request from a DSL modem is associated with a valid subscriber account.

It will be understood that the authentication server 110 can be a Remote Authentication Dial-In User Service (RADIUS) server which is an authentication, authorization, and accounting protocol for network applications, such as DSL access as described herein, or other types of network access applications such as mobile applications. In operation, the RADIUS server can provide at least two separate functions according to some embodiments of the invention. In particular, the RADIUS server can detect whether the user name and password provided by the DSL modem 105 is a default user name and password and can also detect whether the user name and password is a unique user name and password subsequently assigned by the network access provider as described herein. Therefore, during installation of the DSL modem 105, the authentication server 110 can detect the default user name and password provided by the DSL modem 105 and indicate that the subscriber account associated with the DSL modem 105 is authentic. After installation, the authentication server 110 may detect the unique username and password for the subscriber account. It will be understood that the authentication server 110 can use any known authentication scheme, such as Password Authentication Protocol (PAP), Challenge-handshake authentication protocol (CHAP) or Extensible Authentication Protocol (EAP).

To assist in authenticating the subscriber account during installation, the DSL modem 105 can provide modem information that uniquely identifies the subscriber account and, therefore, the DSL modem 105. In some embodiments according to the invention, the modem information can include a DSL modem serial number, a manufacturer, a modem type, and other parameters such as those described in DSL Form TR-069 entitled "CPE WAN management protocol" produced by the DSL home-technical working group which is available on the Internet at DSLforum.org, the entire contents of which is incorporated herein by reference in its entirety. For example, the default user name and password and DSL modem information can be provided in a CPE initiated notification message (supported by the TR-069 CPE WAN management protocol) that allows the DSL modem 105 to "bootstrap" initial communications between the DSL modem 105 and the network access provider system 120. It will be understood that the CPE initiated notification messages can also be used to provide periodic communication with the network access provider system on an ongoing basis to report events as they occur, such as when an IP address of the DSL modern 105 changes, etc.

Although not explicitly shown in FIG. 1, it will be understood that the communication from the DSL modem 105 to the network access provider system 120 may be initially received by a network access server which invokes the authentication services of the authentication server 110 as described above. In particular, the network access server can receive the default user name and password (and the unique user name and password after installation) which is passed to the authentication server 110. It will be understood that the communications between the DSL modem 105 and the network access provider system 120, such as the transmission of the default user name and password over the connection 107, may be implemented as part of a point-to-point protocol supported by the network access provider system 120 and the DSL modem 105.

Still referring to FIG. 1, once the authentication server 110 determines that the subscriber account associated with the DSL modem having transmitted the default user name and password is authentic, an authentication indication is provided via a connection 127 to a CPE Management System 125. In some embodiments according to the invention, the CPE Management System 125 can receive the authentication indication 127 including the DSL modem serial number, manufacturer, modem model no., software version, hardware version, description, and other information associated with the DSL modem 105 as described, for example, in DSL forum TR-069B.2.3 parameter list.

Figure 5:
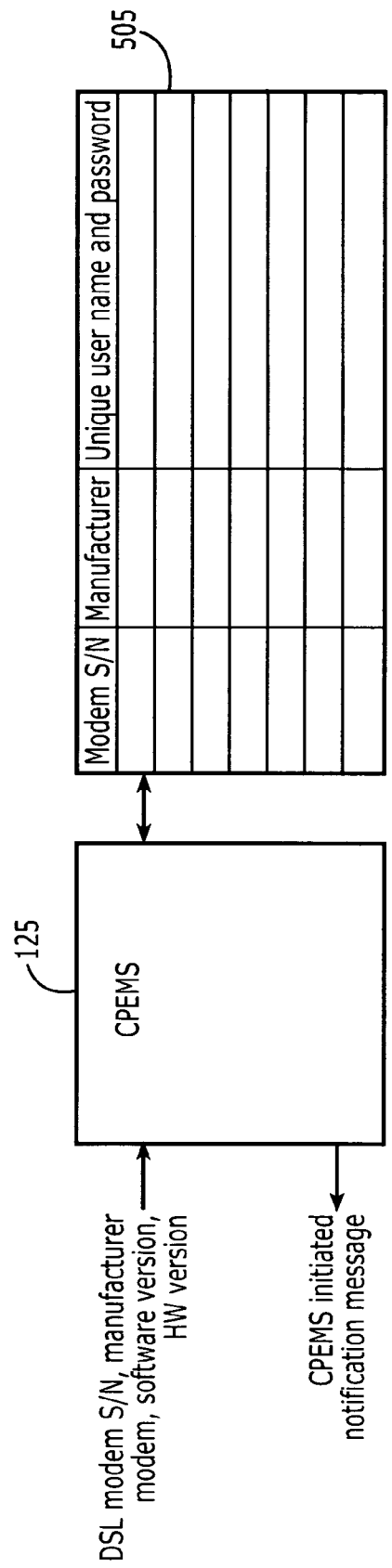
FIG. 5 is a schematic illustration of a CPE management system according to some embodiments of the invention.

It will be understood that the CPE Management System 125 can be any autoconfiguration system that provides dynamic service provisioning of the DSL modems 105. In particular, the CPE Management System 125 may enable the provisioning of a large number of DSL modems 105. As shown in FIG. 5, the CPE Management System 125 can store the DSL modem information received as part of the indication 127 of authentication in a table 505 that allows the CPE Management System 125 to provide dynamic service provisioning, as well as software image management, status and performance monitoring, and diagnostics, etc. associated with the plurality of DSL modems 105 managed by the CPEMS 125.

The table 505 can also include a unique user name and password to be associated with each of the DSL modems 105/subscriber accounts managed by the CPE Management System 125. Upon receipt of the indication that the subscriber account associated with the DSL modem 105 is authenticated, the CPE Management System 125 can originate a CPEMS initiated notification message to the DSL modem 105, including the unique user name and password associated with the DSL modem information in the table 505.

Upon receipt of the CPEMS initiated notification message, the DSL modem 105 stores the default user name and password internally so that subsequent requests for access to the network access provider can be made using the unique user name and password assigned by the network access provider. In particular, the DSL modem 105 may initiate another connection to the network access provider without subscriber intervention in response to the receipt of the unique user name and password from the CPE Management System 125. The DSL modem 105 transmits the connection request including the unique user name and password over the network connection 107 to the authentication server 110.

As described above in reference to the multiple functions provided by the authentication server 110, the unique user name and password associated with the DSL modem 105 can be separately authenticated, wherein the network access server is notified that the connection request from the DSL modem 105 is authentic and should be allowed. Authentication is, therefore, provided via the presentation of the default user name and password in the initial stage of the DSL modem 105 installation and by presentation of the unique user name and password during the secondary stage of the DSL modem installation.

Once the connection request from the DSL modem 105 is authenticated, the network access server may authorize the subscriber to use specified services from the network access provider. For example, authorization may be based on restrictions, such as time of day restrictions or physical location, restrictions against multiple log-ins by the same subscriber, etc. Further examples of services that may or may not be authorized include IP address filtering, address assignment, QOS/differential services, bandwidth control/traffic management, compulsory tunneling to a specific end point, encryption, etc.

Still referring to FIG. 1, in some embodiments according to the invention, the indication 112 that the default user name and password is authenticated results in the redirection of the connection from the DSL modem to a walled garden 115. The walled garden 115 is used to provide terms and conditions required by the network access provider before access to the services is granted. If the subscriber does not accept the terms and conditions specified by the walled garden 115, the connection is terminated. If however, the subscriber accepts the terms and conditions provided by the walled garden 115, an authentication indication is provided via connection 117 to the CPE Management System 125 indicating that the default user name and password is authentic and the terms and conditions have been accepted.

It will be understood that the term "walled garden," refers to a secure environment that does not allow the subscriber to navigate beyond the content provided therein. For example, the walled garden can be a website that does not allow the subscriber to specify a Uniform Resource Locator (URL) to redirect the connection to a different website. Accordingly, the use of a walled garden restricts access to the services provided by the network access provider until after the terms and conditions offered therein have been accepted.

Therefore, as described above in reference to FIG. 1, in some embodiments according to the invention, the DSL modem 105 can be delivered to the subscriber location preconfigured with a default user name and password which is transmitted to the authentication server 110 in a message format that is supported by TR-069 CPE WAN management protocol, including a unique DSL modem information (such as a serial number, manufacturer, etc.). The authentication server 110 indicates that the default user name and password provided by the DSL modem 105 is authentic, whereupon the CPE Management System 125 transmits a unique user name and password to the DSL modem 105 identified by the unique DSL modem information. DSL modem 105 stores the unique user name and password therein and subsequently uses the unique user name and password for requests for services from the network access provider.

Figure 2:
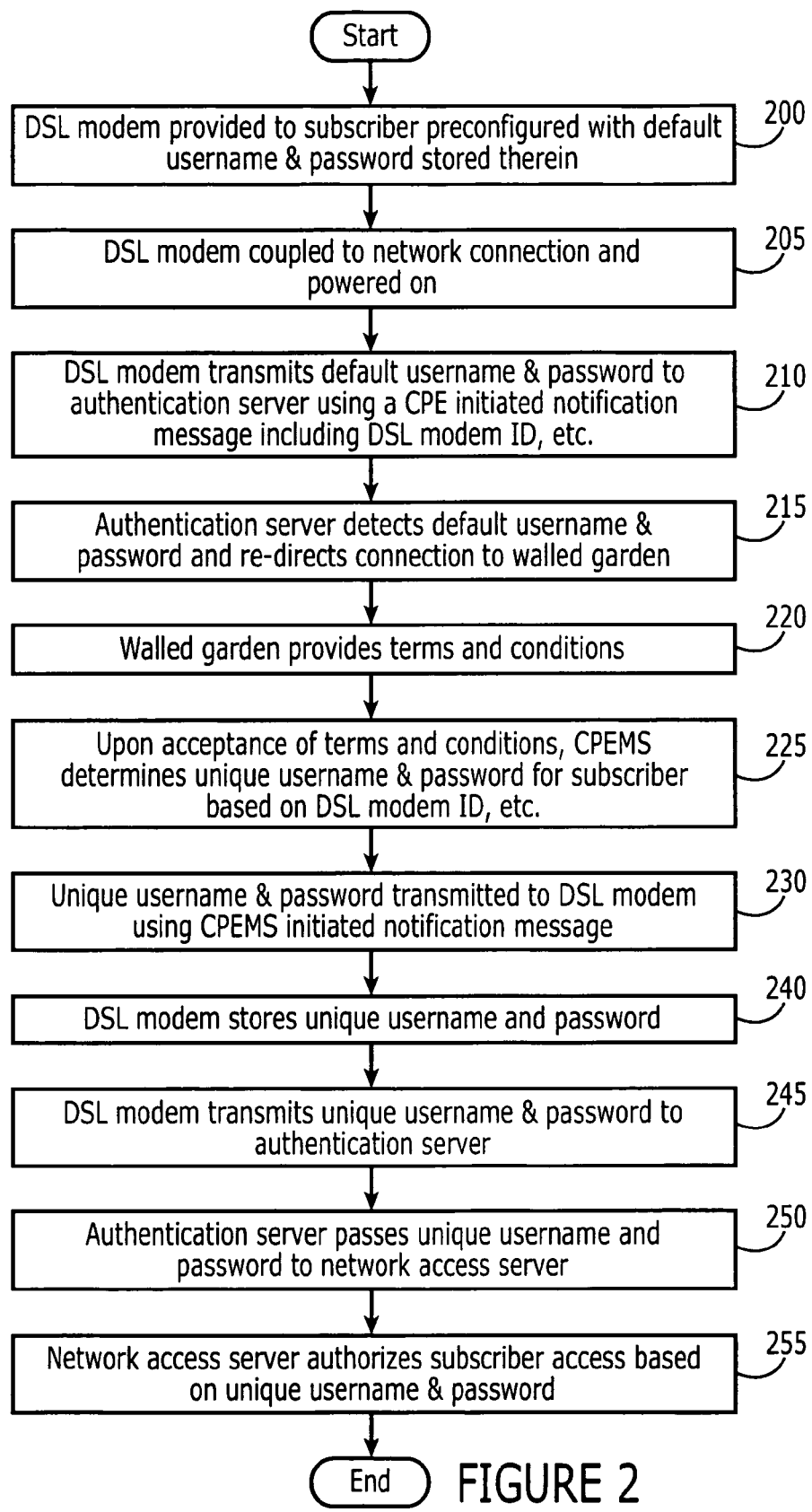
FIG. 2 is a flowchart that illustrates operations of DSL modems and network access provider systems according to some embodiments of the invention.

FIG. 2 is a flowchart that illustrates operations of a DSL modem and a network access provider system according to some embodiments of the invention. According to FIG. 2, the DSL modem is provided to the subscriber location preconfigured with the default user name and password stored therein (block 200). The DSL modem is coupled to the network connection and powered on (block 205). The DSL modem transmits the default user name and password to the authentication server using a CPE initiated notification message including the DSL modem information, etc. (block 210). The authentication server detects the default user name and password and redirects the connection to the walled garden (block 215). The walled garden provides the terms and conditions for access to the network via the network connection of the DSL modem (block 220).

Upon acceptance of the term and conditions, the CPE Management System determines the user name and password for the subscriber account based on the DSL modem information, etc. (block 225). The unique user name and password are transmitted by the CPE Management System to the DSL modem in a CPEMS initiated notification message (block 230). The DSL modem stores the unique user name and password (block 240) and transmits the unique user name and password to the authentication server to request a connection (block 245). The authentication server indicates that the unique user name and password for the subscriber account is authentic (block 250) whereupon the network access server authorizes the subscriber account to access the network based on the unique user name and password (block 255).

Figure 3:
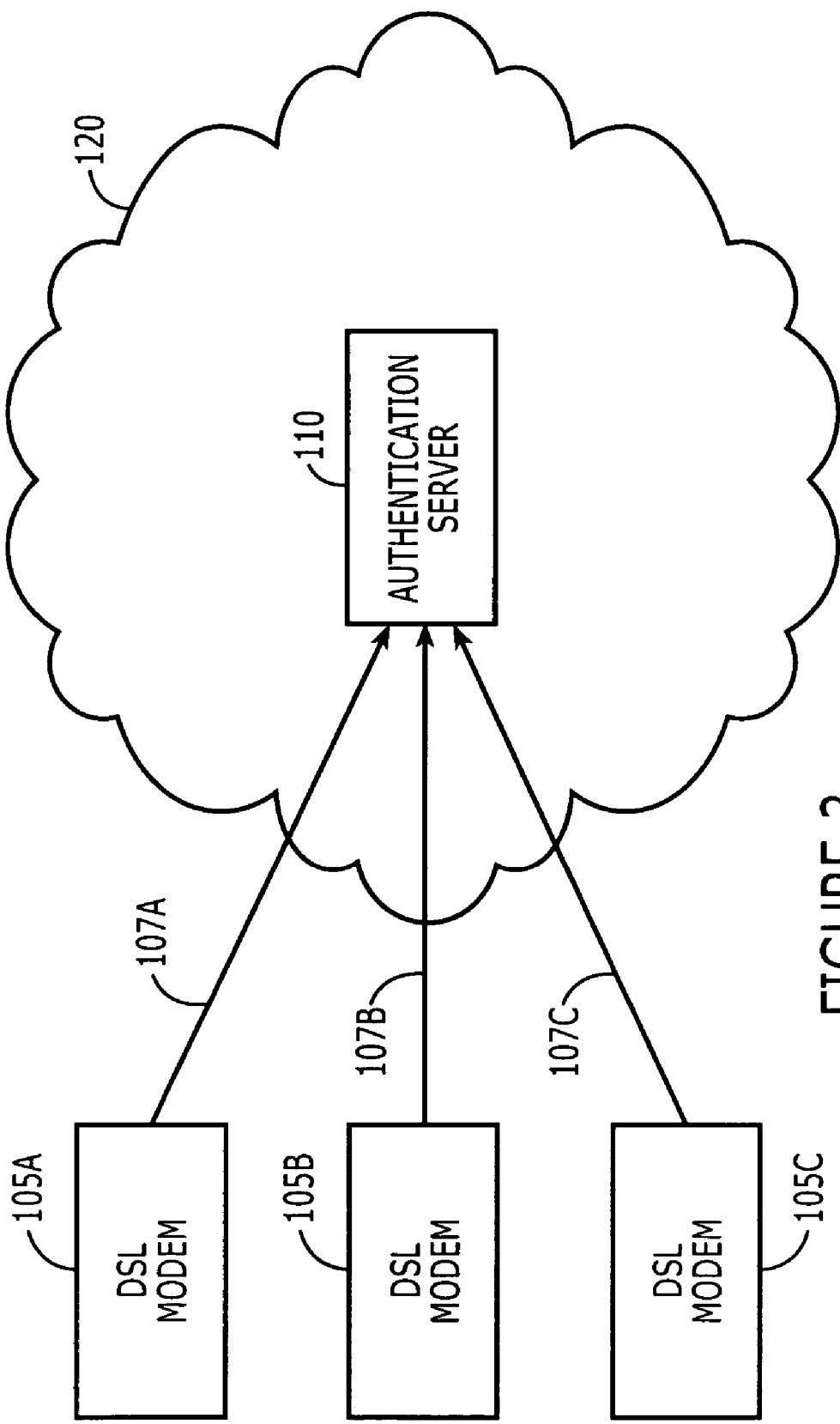
FIG. 3 is a schematic illustration of a plurality of DSL modems coupled to a network access provider system each preconfigured with the same default user name and password according to some embodiments of the invention.

FIG. 3 is a schematic illustration of a plurality of DSL modems 105A-C coupled to the authentication server 110 via a respective plurality of network connections 107A-C according to some embodiments of the invention. According to FIG. 3, each of the DSL modems 105A-C is preconfigured with the same default user name and password prior to installation at the respective subscriber location. During installation of the respective DSL modem 105A-C, each DSL modem 105A-C transmits a CPE initiated notification message including the same default user name and password and respective unique modem identifiers. Accordingly, in some embodiments according to the invention, a plurality of separate DSL modems 105A-C can be provisioned by transmitting the same default user name and password to the authentication server 110. Subsequently, separate messages are transmitted to the respective DSL modems 105A-C including the respective unique user names and passwords to be associated with each of the DSL modems 105A-C.

Figure 4:
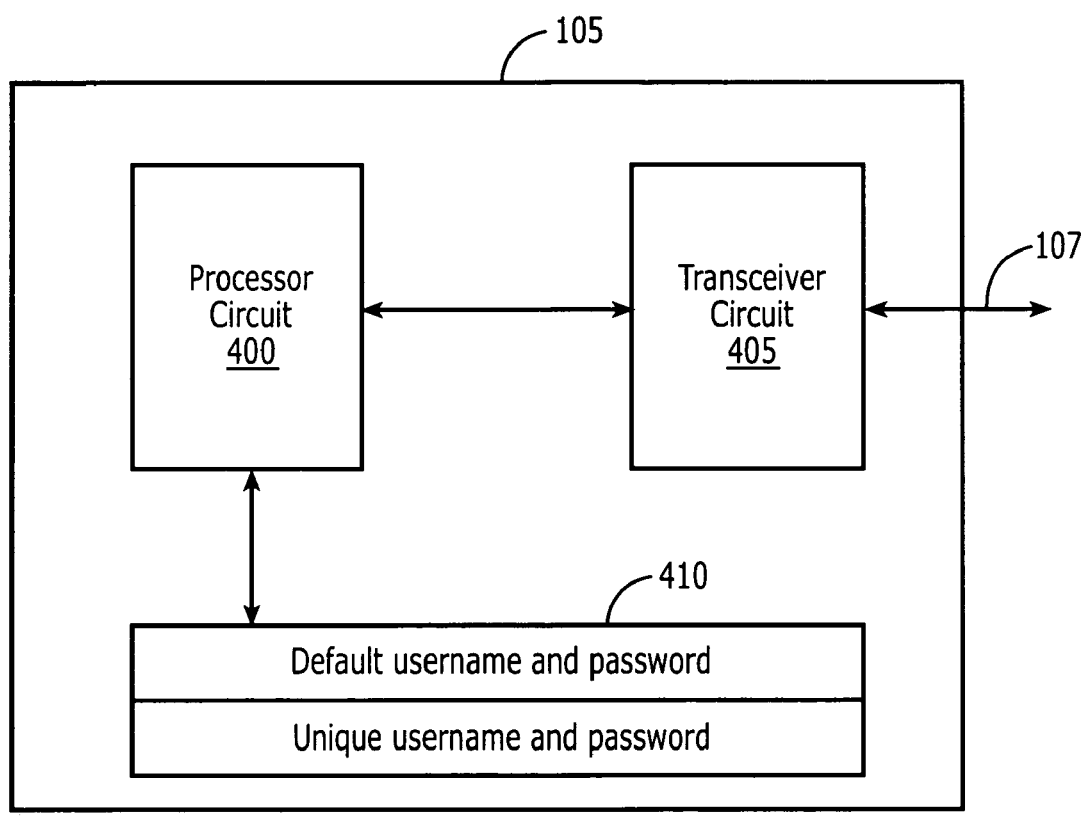
FIG. 4 is a schematic illustration of a DSL modem according to some embodiments of the invention.

FIG. 4 is a schematic illustration of a DSL modem according to some embodiments of the invention. In particular, the DSL modem 105 includes a transceiver circuit 405 that is coupled to the network connection 107. The transceiver circuit 405 is configured to provide signaling over the network connection 107 in accordance with electrical standards required by the network access provider.

The DSL modem 105 also includes a processor circuit 400 connected to the transceiver circuit 405. It will be understood that the processor circuit 400 is configured to coordinate communication between the DSL modem 105 and the network access provider system 120 including the authentication server 110 and CPE Management System 125 as well as the network access servers through which the DSL modem 105 may access the Internet.

The DSL modem 105 also includes a nonvolatile memory 410 coupled to the processor circuit 400. The nonvolatile memory 410 can be used to store the default user name and password that is preconfigured in the DSL modem 105 prior to delivery and installation of the subscriber location. The nonvolatile memory 410 is also configured to store a unique user name and password provided by the network access provider system 120 as part of the installation procedure as described herein in some embodiments according to the invention.

In general, the DSL modem 105 can be an asymmetrical DSL modem that provides a high speed data connection using the same interconnect that is used to provide plain old telephone service (POTS). In operation, the ADSL may divide up the available frequencies over a conventional phone line so that data rates of approximately 1.5 MBPS to about 10 MBPS may be maintained while relatively low rates of 16 KBPS to about 1 MBPS may be provided for audio communication.

It will be understood that the transceiver circuit can also include circuitry to provide preamplification, filtering, and conversion between analog and digital signal formats. The transceiver circuit can also include circuitry that allows full duplex operation of communications between network access provider system 120 and the DSL modem 105. The processor circuit can be provided by a general purpose microprocessor and/or a digital signal processor, both of which may be programmed to provide the functions described herein.

Figure 6:
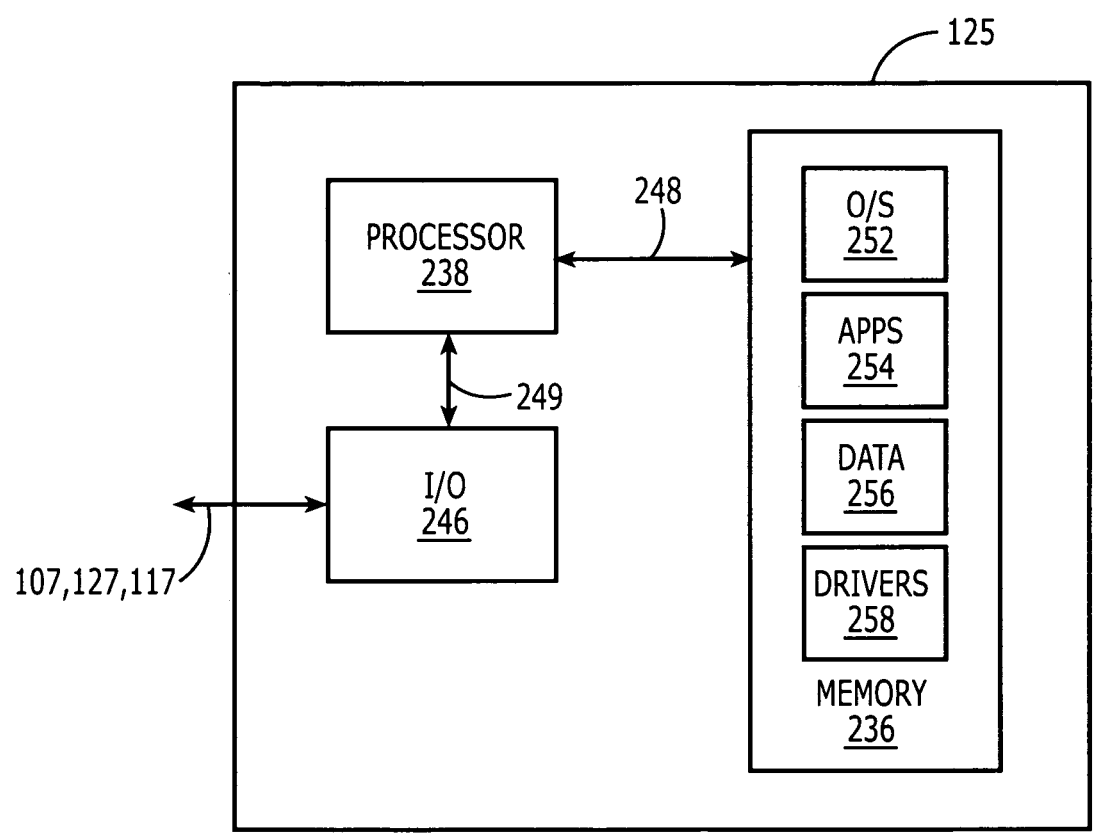
FIG. 6 is a schematic illustration of a general purpose server that can be configured to provide the operations of an authentication server and/or a CPE management system according to some embodiments of the invention.

FIG. 6 is a block diagram of an exemplary authentication server 125 in some embodiments according to the invention. It will be understood that the authentication server 125 can be used to provide the CPE management System disclosed herein. As illustrated, the authentication server 125 includes a processor 238, a memory 236 and input/output (I/O) circuits 246. The authentication server 125 may be incorporated in, for example, a general purpose computer, server, or the like. The processor 238 communicates with the memory 236 via an address/data bus 248 and communicates with the input/output circuits 246 via an address/data bus 249.

The authentication server 125 can be accessed via the network connection 107 (or the connections 127 and/or 117 in the case of the CPE management System 125) through the input/output circuits 246 using, for example, an Internet Protocol (IP) connection to create/forward messages.

The components in the authentication server 125 may be known components such as those used in many data processing systems, which may be configured to operate as described herein. In particular, the processor 238 can be any commercially available or custom microprocessor, microcontroller, digital signal processor or the like. The memory 236 may include any memory devices containing the software and data used to implement the functionality circuits or modules used in accordance with embodiments of the present invention. The memory 236 can include, but is not limited to, the following types of devices: ROM, PROM, EPROM, EEPROM, flash memory, SRAM, DRAM and magnetic disk.

As further illustrated in FIG. 6, the memory 236 may include several categories of software to provide operation of the authentication server 125: an operating system 252; application programs 254 including the software to provide the operations of the authentication server 125 (and/or the CPE Management System) described herein; input/output device drivers 258; and data 256. In some embodiments according to the invention, the data 256 represents the static and dynamic data used by the application programs 254, the operating system 252, and the input/output device drivers 258, that may reside in the memory 236.

The operating system 252 may be any operating system suitable for use with a data processing system, such as OS/2, AIX or zOS from International Business Machines Corporation, Armonk, N.Y., Windows 95, Windows98, Windows2000 or WindowsXP from Microsoft Corporation, Redmond, Wash., Unix or Linux. The input/output device drivers 258 typically include software routines accessed through the operating system 252 by the application programs 254 to communicate with devices such as the input/output circuits 246 and the memory 236.

As described above, a DSL modem can be preconfigured with a default user name and password prior to delivery and installation at a subscriber location. Upon installation, the DSL modem can transmit the default user name and password over a network connection to a network access provider that includes an authentication server. The authentication server can authenticate the default user name and password for the subscriber account, whereupon the authentication server may indicate to a CPE Management System (CPEMS) that the DSL modem for the subscriber account has been authenticated.

The CPE management system can then transmit a unique user name and password to the authenticated DSL modem. The DSL modem can store the unique user name and password for use in subsequent access to the network. The DSL modem can then transmit the default user name and password to the network access provider, whereupon the authentication server authenticates the subscriber account for subsequent access.

Accordingly, the installation of the DSL modem may be conducted with a reduced amount of subscriber intervention. In particular, the DSL modem may be connected to the network, powered on, and authenticated (as described above) without the subscriber providing the unique user name and password assigned by the network access provider, thereby allowing the installation to be simplified.

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method comprising:

receiving, at an authentication server, a default username and a default password for a user account from a digital subscriber line modem without a first input of the default username and the default password by a user, wherein the default username and the default password for the user account are stored in the digital subscriber line modem prior to delivery of the digital subscriber line modem to the user;

authenticating the user account based on the default username and the default password for the user account, wherein authenticating the user account comprises:

responsive to the authenticating of the user account having the default username and the default password stored in the digital subscriber line modem, providing a connection between the digital subscriber line modem and a walled garden website providing terms and conditions for the user account, and transmitting an authentication indication to a customer premises equipment management system, the authentication indication including digital subscriber line modem parameters including a unique digital subscriber line modem identifier;

receiving a second input at the walled garden website via the connection indicating acceptance of the terms and conditions for the user account; and responsive to receiving the second input indicating acceptance of the terms and conditions, transmitting an acceptance indication from the walled garden website to the customer premises equipment management system, the acceptance indication indicating the acceptance of the terms and conditions for the user account; and transmitting a unique username and a unique password for the user account from the customer premises equipment management system to the digital subscriber line modem responsive to the authenticating of the user account.

2. A method according to claim 1 further comprising:

storing the unique username and the unique password for the subscriber account in the digital subscriber line modem.

3. A method according to claim 1 further comprising:

receiving, at the authentication server, the unique username and the unique password for the user account from the digital subscriber line modem;

determining that the unique username and the unique password for the user account are not the default username and the default password; and indicating that the unique username and the unique password for the user account are authentic to a network access server so that the network access server can authorize the user account based on the indicating that the unique user name and the unique password are authentic.

4. A method according to claim 1 wherein receiving a default username and a default password for a user account comprises uploading the default username and the default password from the digital subscriber line modem to the authentication server using a customer premises equipment initiated notification message including the unique digital subscriber line modem identifier and a digital subscriber line modem manufacturer.

5. A method according to claim 4 wherein transmitting the unique username and the unique password for the user account comprises downloading the unique username and the unique password to the digital subscriber line modem using an asynchronous customer premises equipment management system initiated notification message.

6. A method according to claim 5 wherein the customer premises equipment initiated notification message and the customer premises equipment management system initiated notification message comprise technical report 069 customer premises equipment wide area network management protocol formatted communications.

7. A method according to claim 1 wherein the default username and the default password comprise n non-unique default username and default password commonly stored in a plurality of digital subscriber line modems prior to delivery to a plurality of different subscribers.

8. A non-transitory computer-readable storage medium comprising computer instructions for:

receiving, at an authentication server, a default username and a default password for a user account from a digital subscriber line modem without a first input of the default username and the default password by a user, wherein the default username and the default password for the user account are stored in the digital subscriber line modem prior to delivery of the digital subscriber line modem to the user;

authenticating the user account based on the default username and the default password for the user account, wherein the authenticating of the user account comprises:

responsive to the authenticating of the user account having the default username and the default password stored in the digital subscriber line modem, providing a connection between the digital subscriber line modem and a walled garden website providing terms and conditions for the user account, and transmitting an authentication indication to a customer premises equipment management system, the authentication indication including digital subscriber line modem parameters including a unique digital subscriber line modem identifier;

receiving a second input at the walled garden website via the connection indicating acceptance of the terms and conditions for the user account;

responsive to receiving the second input indicating acceptance of the terms and conditions, transmitting an acceptance indication from the walled garden website to the customer premises equipment management system, the acceptance indication indicating the acceptance of the terms and conditions for the user account; and transmitting a unique username and a unique password for the user account from the customer premises equipment management system to the digital subscriber line modem responsive to the authenticating of the user account.

* * * * *